I. W. FORBES.
Improvement in Oscillating Valves for Steam and Air Engines.
No. 115,296.  Patented May 30, 1871.
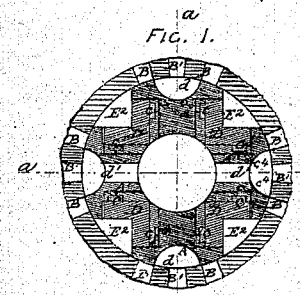
Fig. 1.
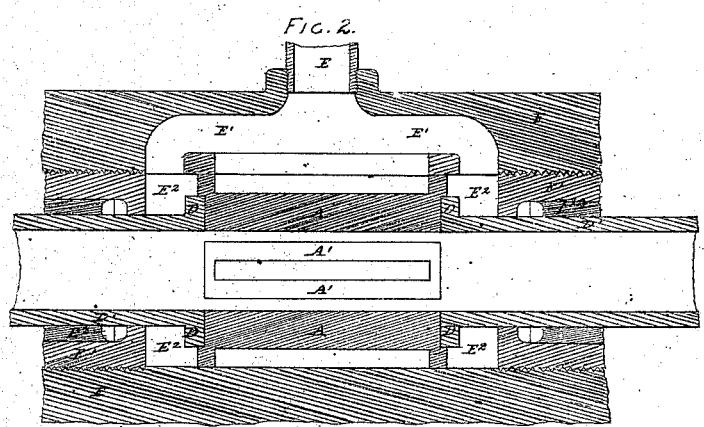
Fig. 2.
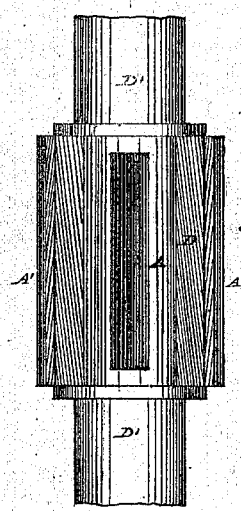
Fig. 3.
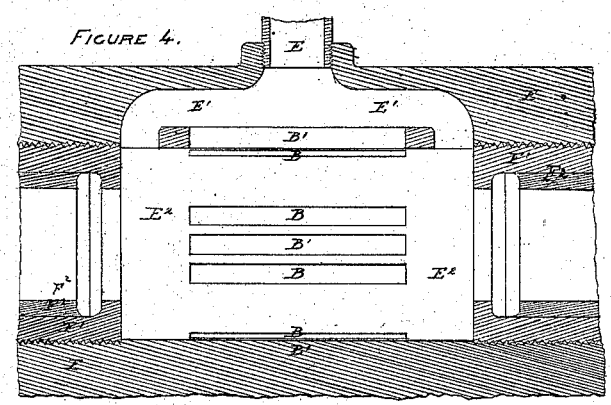
Figure 4.
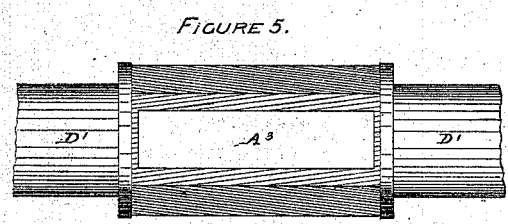
Figure 5.
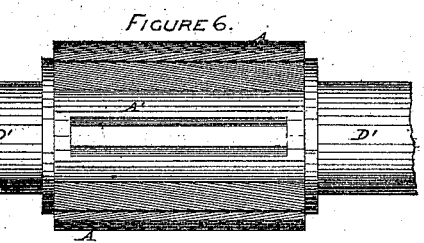
Figure 6.
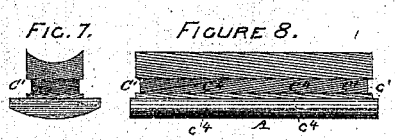
Fig. 7.  Figure 8.  Figure 9.  Figure 10.
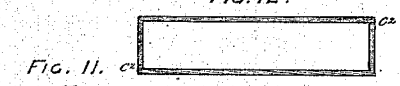
Fig. 12.
Fig. 11.  Fig. 12.ᵃ
INVENTOR.
Isaac W. Forbes
Witnesses.
W. H. Nickel
W. J. Peyton 2 Sheets--Sheet 2.
I. W. FORBES.
Improvement in Oscillating Valves for Steam and Air Engines.
No. 115,296.            Patented May 30, 1871.
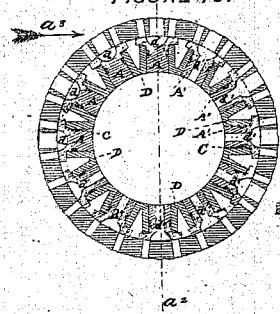
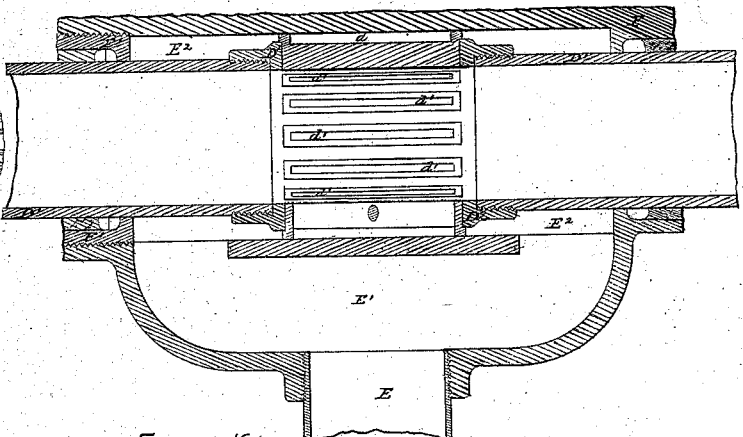
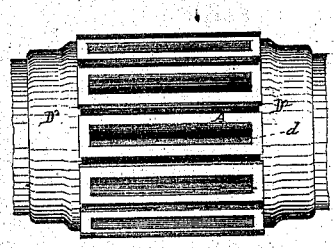
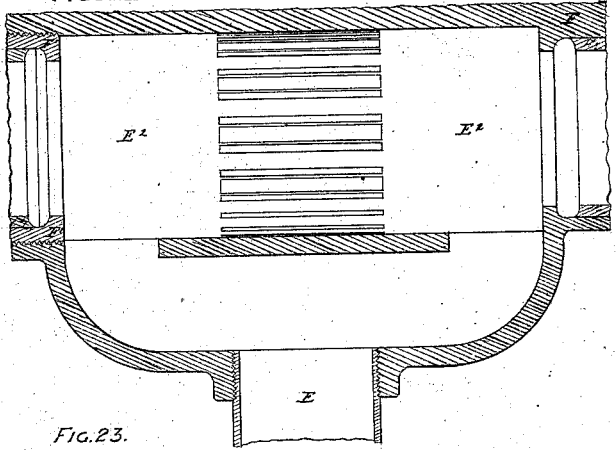
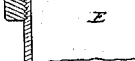
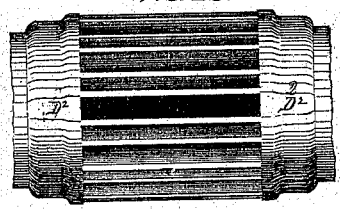
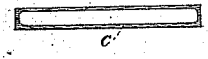
INVENTOR.
Isaac W. Forbes
Witnesses.
W. H. Finckel 115,296

UNITED STATES PATENT OFFICE.

ISAAC WILLIAM FORBES, OF LA PORTE, INDIANA.

IMPROVEMENT IN OSCILLATING VALVES FOR STEAM AND AIR ENGINES.

Specification forming part of Letters Patent No. 115,296, dated May 30, 1871.

I, ISAAC WILLIAM FORBES, of La Porte, in the county of La Porte and State of Indiana, have invented certain Improvements in Oscillating Valves for Steam or Air Engines, of which the following is a specification:

Nature and Object of the Invention.

This invention consists, principally, in the construction and arrangement of the valve, and its relation to the case or steam-chest in which it works, as will be hereinafter more fully described.

Description of the Accompanying Drawing.

Figure 1 represents a cross-section of a quadruple male oscillating valve and its seat, with the outside portions of the valve-case broken off. Fig. 2 is a longitudinal central section of Fig. 1, shown by dotted lines $a\ a$. In addition to that figure, Fig. 2 has the induction steam-pipe and steam-passages to the steam-chest or valve-seat. This steam-pipe and passages extending to the valve-seat should be between induction-ports B B, without interfering with either of said ports or exhaust-ports. Fig. 3 is the valve-frame with the stems broken off and valves in their proper position, forming a quadruple valve, as viewed in direction of $a\ a$ in Fig. 1, if the case were removed from the valve and it was not sectional. Fig. 4 is the same as Fig. 2 with the valve removed, exposing the ports to view. Fig. 5 is the valve-stem and frame for receiving the valves. Fig. 6 is a full view of a quadruple valve-frame and stem complete, as in Fig. 3, viewed from an opposite direction, and in the direction of $a\ a$, Fig. 1, if the case were removed. Fig. 7 is an end view of a male valve with the packing-ring or band removed. Fig. 8 is a side view of single valve with the packing-ring removed. Fig. 9 is a side view of a single valve complete, ready for being put in its frame. Fig. 10 is an inside view of that part of the valve which fits to its frame, with the ends fitting in the frame rounded instead of square. Fig. 11 is an end-sectional view of a double valve-seat and port. Fig. 12 is the packing-band. Fig. 12$^a$ is another form of packing-band. Fig. 13 is a cross-central sectional view of a twelvefold valve, seat, and ports, with two variations of valves, and their different methods of exhausting. Fig. 14 is a longitudinal central section of the valve, valve-seat, steam-chest with the induction steam-pipe, and the passage for conveying steam to the steam-chest, the same as represented in Fig. 13 by dotted lines $a^2\ a^2$, with induction steam-pipe and steam-passage in addition. Fig. 15 is a full view of the valve, but with the ends of the stem broken off. Fig. 16 is the same as Fig. 14, with the valve removed, exposing to view the induction and exhaust ports. Fig. 17 is an end view of the valve with the packing ring or band removed. Fig. 18 is an outside view of a single valve with the exhaust-passage passing through it. Fig. 19 is an outside view of the same valve, representing that part which fits in the frame with the end rounded. It may be square instead, as in Fig. 17. Fig. 20 is the valve-frame and broken stem with the valves removed. Fig. 21 is an outside view of a solid valve, which allows the exhaust to pass under instead of through, if necessary, as in Figs. 18 and 19. Fig. 22 is a side view of the valve complete with packing-ring ready for being put in its frame. Fig. 23 is a side view of the valve with a gland on in place of a steam-packing band. Fig. 24 is a view of the edge of the steam-packing band.

The term valve, used in this specification, is sometimes applied to the single or separate and detached valve-piece by itself, as represented in Fig. 9, and sometimes to these same parts when combined together in a frame and forming a complete valve, ready for use, which may extend from one to any required number, as desired.

D D is that part of the valve-stem which forms the frame in which the valves fit. $D^1\ D^1$ is the valve-stem. $D^2\ D^2$ are valve-frames designed for a twelvefold valve. $D^3\ D^3$ is the valve-frame for a twofold valve. E is induction steam-pipe. $E^1\ E^1$ is steam-passage leading to steam-chest and valve-seat. F F is the steam-chest forming the valve-seat, with stuffing-boxes screwed in at each end. The steam-chest is bored out to fit the valve, with valve-seat of eight receive-ports and four exhaust-ports between the induction-ports, as represented by B B B and B' B', respectively, in Figs. 1 and 4. F' F' are stuffing-boxes. $C^1$ is a recess in the valve, extending around the same, upon which the packing-ring is fitted. $E^2\ E^2$, steam-chest. $A^3$ is the mortise in valve-frame into which valve fits. $C^2 C^2$, Fig. 12, are edges of steam-packing band. $C^3 C^3$, Fig. 12$^a$, are edges of bands of a different class, made in four pieces, and different from that in Fig. 12. This valve is designed to operate with single or double or any number of cylinders.

Claims.

1. Valves A A, valves $A^1 A^1$, as and for the purpose set forth.

2. Valve-frame D D with its stem or stems $D^1 D^1$, as and for the purpose set forth.

3. Valves A A and valves $A^1 A^1$ in combination with the frame D D and valve stem or stems $D^1 D^1$, as and for the purpose set forth.

4. Valves A A, in combination with the frame D D D D and valve stem or stems $D^1 D^1$.

5. Valves $A^1 A^1$, in combination with frames D D and valve stem or stems $D^1 D^1$.

6. Induction-ports B B, exhaust-ports B' B', in combination with valves A A and $A^1 A^1$, or with A A, or with $A^1 A^1$ singly, as and for the purposes set forth.

I. W. FORBES.

Witnesses:
W. H. FINCKEL,
W. J. PEYTON.